(12) United States Patent
Niewöhner et al.

(10) Patent No.: US 7,993,549 B2
(45) Date of Patent: Aug. 9, 2011

(54) PROCESS FOR PRODUCING CARBON-CERAMIC BRAKE DISCS

(75) Inventors: Joachim Niewöhner, Biberbach (DE); Markus Stettberger, Allmannshofen (DE); Arno Sommer, Bobingen (DE); Dunja Müller, Donauwörth (DE); Jens Rosenlöcher, Augsburg (DE)

(73) Assignee: Audi AG (DE)

( * ) Notice: Subject to any disclaimer, the term of this patent is extended or adjusted under 35 U.S.C. 154(b) by 1085 days.

(21) Appl. No.: 11/228,080

(22) Filed: Sep. 16, 2005

(65) Prior Publication Data

US 2006/0062987 A1    Mar. 23, 2006

(30) Foreign Application Priority Data

Sep. 23, 2004  (EP) ................................ 04022664

(51) Int. Cl.
*C01B 31/00* (2006.01)
*B27N 3/18* (2006.01)
*C04B 35/64* (2006.01)

(52) U.S. Cl. ...... 264/29.1; 264/29.7; 264/319; 264/656

(58) Field of Classification Search ............ 264/29.7, 264/317, 610
See application file for complete search history.

(56) References Cited

U.S. PATENT DOCUMENTS

| | | | |
|---|---|---|---|
| 6,042,935 A * | 3/2000 | Krenkel et al. | ............ 428/307.7 |
| 6,723,193 B2 | 4/2004 | Martin | |
| 6,818,288 B2 | 11/2004 | Bauer et al. | |
| 6,824,862 B2 * | 11/2004 | Bauer et al. | ................. 428/293.4 |
| 6,908,660 B2 | 6/2005 | Bauer et al. | |
| 7,105,111 B2 * | 9/2006 | Bauer et al. | ................... 264/29.7 |
| 2002/0153213 A1 * | 10/2002 | Gruber et al. | ........... 188/218 XL |
| 2003/0068164 A1 | 4/2003 | Nanjyo | |
| 2003/0129375 A1 | 7/2003 | Bauer et al. | |
| 2003/0207749 A1 | 11/2003 | Bauer et al. | |

FOREIGN PATENT DOCUMENTS

| | | |
|---|---|---|
| DE | 100 66 044 | 6/2002 |
| EP | 0 797 555 | 10/1997 |
| EP | 1 314 708 | 5/2003 |
| EP | 1 323 944 | 7/2003 |

* cited by examiner

*Primary Examiner* — D. Lawrence Tarazano
*Assistant Examiner* — Camie S Thompson
(74) *Attorney, Agent, or Firm* — Connolly Bove Lodge & Hutz LLP

(57) ABSTRACT

Process for producing carbon-ceramic brake discs comprising the following steps:

production of a carbonized core body by press-molding a mixture containing reinforcing fibers and a binder, curing the binder by heating, and carbonizing by heating the press-molded body under exclusion of oxidizing substances to a temperature of between 750° C. and 1300° C., press-molding a moldable, reinforcing fiber-containing material onto the prefabricated carbonized core body which after the additional process steps produces the friction layer, curing the material for the friction layer, carbonizing the entire body and then infiltrating the composite body with liquid silicon.

5 Claims, No Drawings

PROCESS FOR PRODUCING CARBON-CERAMIC BRAKE DISCS

FIELD OF THE INVENTION

The invention concerns a process for producing carbon-ceramic brake discs.

BACKGROUND OF THE INVENTION

Carbon-ceramic brake discs and processes for producing them are known from the patent literature, for example from EP 0 797 555 A1. This document describes how separately manufactured core bodies and friction bodies are joined together with a bonding layer containing silicon carbide. Infiltration with silicon can be carried out separately for each body, and the carbon-ceramic brake disc is produced by placing a siliconised core body and at least one siliconised friction body on top of one another and infiltrating liquid silicon into the gap between the bodies. The disadvantage of this process is that a bonding layer is formed between the friction layer and the core body which consists largely of silicon. This layer has a lower strength than the fibre-reinforced ceramic phase.

A further, improved process is known from DE 100 66 044 A1 wherein a carbon-ceramic brake disc comprising a core body and at least one separate friction layer is produced by first separately manufacturing preforms for the friction layer, placing these preforms in a so-called master mould for the core body and filling the master mould with a material for the core body and producing from this composite the preform for the friction body, which is then pyrolysed and infiltrated with silicon.

This process does not require a specially produced bonding layer between the core and friction bodies. Equally, only one siliconisation is required, namely that of the composite comprising the core and friction bodies. In practice, however, it has been found that this process presents disadvantages. Since the friction layer is markedly thinner than the core body (approx. 0.5 mm to 1.5 mm as compared with approx. 20 mm to approx. 40 mm), high losses are complained of when handling the brittle carbonised preforms for the friction layer, despite special care and attention.

The object of the invention is therefore to provide an improved process for producing carbon-ceramic brake discs, wherein handling is simplified and material loss is reduced.

This object has been achieved by pressing onto a prefabricated carbonised core body a deformable material which after the subsequent process steps forms the friction layer, and the press-moulded body formed in this way is carbonised and then siliconised.

DETAILED DESCRIPTION OF THE PREFERRED EMBODIMENTS

In a preferred manner a material in which the reinforcing fibres are staple fibres whose average length does not exceed 30 mm is used to manufacture the friction layer. The material for the friction layer is preferably a mouldable composition reinforced with carbon staple fibres which when heated to the exclusion of oxidising gases forms a residue of porous carbon, the weight of which amounts to at least 50% of the composition used that does not consist of fibres.

In a further preferred manner a core body is used for the process according to the invention which is textured on the surface facing the friction layers, wherein the texturing is an irregular or a regular roughening of the surface, preferably in the form of pyramidal, conical or spherical bumps or indentations or furrow-like notches. Such a texturing of the surface leads to improved adhesion of the friction layer to the core body. Examinations of the boundary layer have shown that during press moulding the flow processes that occur cause the staple fibres in the friction layer material to arrange themselves in such a way that an interlocking can be observed with the moulding blank for the core body. This interlocking can be promoted by texturing the surface of the core body and by the choice of the average length of the staple fibres in the friction layer material.

Surprisingly it has also been found that if core bodies having a textured surface are used, the dissipation of heat from the friction layer towards the inside is significantly improved. Under the same mechanical load (braking from a defined speed over the same period of time) a lower surface temperature is measured if a textured core body surface is used than with a smooth core body surface on a carbon-ceramic brake disc having otherwise the same structure.

It has also surprisingly been found that the process according to the invention also leads to an improvement in the uniformity of the friction lining thickness. With the separate manufacture of friction layer bodies and core bodies and subsequent joining by bonding and joint siliconisation, the finished carbon-ceramic brake disc requires secondary finishing by grinding so that the surfaces are aligned exactly perpendicular to the axis of rotation. With uneven siliconisation or an uneven application of the bonding layer this can lead to irregularities in the thickness of the friction layer after grinding, which shorten the working life of the carbon-ceramic brake disc. The same problem arises if prefabricated friction layers are placed in a mould and press-moulded together with the composition forming the core body.

The greater thickness of the core bodies and the resulting robustness alone means that handling of the prefabricated core bodies does not present a problem. When press-moulding the prefabricated core body with the material for the friction layer it has surprisingly been found that the friction layer is formed in a uniform thickness, evidently because of the thickness ratios and the better flow of: the friction layer material. This can be further supported by preheating the core body before placing it in the mould for press moulding. A minimum temperature for the surface of the core body of 50° C. has proved advantageous. The adhesion of the friction layer press-moulded to the core body is likewise better than if glued to the finished body or if the material for the core body is press-moulded between prefabricated friction layer bodies. This leads to an improvement in the strength and to a further increase in the wear resistance. The observed improvement in adhesion is further promoted by the texturing of the surface of the core body as described above.

The material for the friction layer preferably contains mass fractions of 40% to 80% of reinforcing fibres, which preferably consist of carbon or graphite, up to 1% of polymers which are broken down without residue at temperatures of 900° C. to 1000° C. (down to less than 1% of their original mass), and 20% to 60% of binders, preferably selected from thermoset resins and pitches and mixtures thereof, which produce a yield of at least 50% of their original mass of carbon if they are heated with exclusion of oxidising substances to temperatures of 900° C. to 1000° C. (carbonised), preferably phenolic resins or mixtures of phenolic resins having a proportion by weight of up to 40% of pitches in the mixture. Polyvinyl alcohol is preferred in particular as the resin which breaks down without residue. The sum of the mass fractions in the cited mixtures is always 100%. The average fibre length (weight average) here is a maximum of 30 mm, preferably a maximum of 20 mm, and particularly preferably a maximum of 10 mm. Particularly good adhesion is achieved if the average fibre length is a maximum of 5 mm, in particular a maximum of 1 mm.

Longer reinforcing fibres are used for the core bodies than for the friction layers; the average fibre length here is preferably over 30 mm, preferably at least 40 mm, and particularly preferably at least 50 mm. The reinforcing fibres preferably include a mass fraction of at least 20% with a fibre length of over 30 mm. The mass fraction of reinforcing fibres is preferably likewise 40% to 80%; phenolic resins and mixtures of phenolic resins with pitches (mass fraction of pitches in this mixture preferably 10% to 25%) are preferred as binders. The core body is press-moulded from a composition having the cited composition, wherein the side of the moulding ram facing the material is smooth or preferably textured in such a way that the desired positive texture is produced on the surface of the moulding from the corresponding negatively textured surface of the moulding ram. After press-moulding or during press-moulding the core bodies are cured by hardening the resin and carbonised in a suitable oven at approximately 950° C. with exclusion of oxidising substances. A porous but mechanically strong body is formed in this process.

In order to produce the carbon-ceramic brake disc having the composition according to the invention, compression moulds for the brake discs are first filled with an adequate amount of the material for the friction layer. The carbonised core body is then placed on top of this layer and it in turn is covered with the adequate amount of friction layer composition; the mould is closed and placed on the press table and the multi-layer composite is press-moulded at room temperature or elevated temperature. Due to the greater height or thickness of the prefabricated core body, this body can be introduced into the mould without difficulty (no tilting), whereas when introducing prefabricated friction layers the thin sheet could easily tilt and could also easily be broken in the process. The tests which led to this invention also showed that the favourable action of the surface texturing can also be supported in particular by the porosity of the surface of the core body. A corresponding texturing of the surface of the prefabricated friction layer would not have been possible on geometric grounds alone (due to the thinness of the friction layers). It has also proved favourable if a higher porosity is generated in the vicinity of the top surfaces of the core body through a non-homogeneity in the material for the core body. This can be easily achieved if in the vicinity of the top surfaces the mixture contains a larger proportion of resins having a lower carbon yield.

Particularly favourable adhesion results are achieved if the carbonisation of the core body is not carried through to completion but only as far as a state in which the loss of mass through the decomposition of the binder has reached only 80% of its maximum value.

In testing under thermocyclic loading in particular, carbon-ceramic brake discs produced according to the invention displayed a longer operating life than discs produced with prefabricated friction layers or those in which the friction body and brake body were produced separately and then bonded and siliconised together.

The invention claimed is:

1. A process for producing carbon-ceramic brake discs comprising a core body and at least one friction layer, the process comprising the following steps:
   production of a prefabricated carbonised core body by press-moulding a mixture containing a mass fraction of from 40% to 80% of reinforcing fibres and a binder which is a phenolic resin or a mixture of a phenolic resin and a pitch, curing the binder by heating, and carbonising by heating the press-moulded body with exclusion of oxidising substances to a temperature of between 750 C and 1300 C,
   filling a compression mould with a deformable mouldable, reinforcing fibre-containing material for the friction layer, placing a prefabricated carbonised core body on top of this layer, and covering the prefabricated carbonised core body in turn with material for the friction layer, closing the mould, placing the mould on a press table and press-moulding the multi-layer composite,
   curing the material for the friction layer, carbonising the entire press-moulded body and then infiltrating with liquid silicon,
   wherein the surface of the prefabricated core body facing the friction layer is textured, the texturing on the surface facing the friction layer being in the form of pyramidal, conical or spherical bumps or pyramidal, conical or spherical indentations.

2. The process according to claim 1, wherein a material in which the reinforcing fibres are staple fibres whose average length does not exceed 5 mm is used for the friction layer.

3. The process according to claim 1, wherein the material for the friction layer contains mass fractions of 40% to 80% of reinforcing fibres, up to 1% of polymers which are decomposed without residue at temperatures of 900 C to 1000 C, and 20% to 60% of resins which produce a yield of at least 50% of their original mass of carbon if they are heated under exclusion of oxidising substances to temperatures of 900 C to 1000 C.

4. The process according to claim 1, wherein the carbonisation of the core body in a first step of the process is carried through only to a state in which the loss of mass through decomposition of the binder has reached only 80% of its maximum value.

5. The process according to claim 1, wherein the average length of the reinforcing fibres in the mixture containing reinforcing fibres and a binder which is used in the production of the said carbonised core body is over 30 mm.

* * * * *